(12) United States Patent
Parameshwaran et al.

(10) Patent No.: US 9,816,628 B2
(45) Date of Patent: Nov. 14, 2017

(54) CHECK VALVE (71) Applicant: Forum Severe Service Valves LLC, Houston, TX (US)

(72) Inventors: Shreyas Parameshwaran, Stafford, TX (US); Gregory Gilbert, Stafford, TX (US)

(73) Assignee: FORUM SEVERE SERVICE VALVES, LLP, Houston, TX (US)

( * ) Notice: Subject to any disclaimer, the term of this patent is extended or adjusted under 35 U.S.C. 154(b) by 0 days.

(21) Appl. No.: 15/098,145

(22) Filed: Apr. 13, 2016

(65) Prior Publication Data

US 2017/0299073 A1    Oct. 19, 2017

(51) Int. Cl.
*F16K 15/03* (2006.01)
*F16K 15/02* (2006.01)
*F16K 1/20* (2006.01)

(52) U.S. Cl.
CPC .......... *F16K 15/03* (2013.01); *F16K 1/2035* (2013.01); *F16K 15/023* (2013.01)

(58) Field of Classification Search
CPC ....... F16K 15/03; F16K 1/2035; F16K 15/023
USPC .............................................. 137/527, 527.8
See application file for complete search history.

(56) References Cited

U.S. PATENT DOCUMENTS

| | | | | |
|---|---|---|---|---|
| 200,678 | A | * | 2/1878 | Whitney ................ F16K 15/03 137/527.2 |
| 274,222 | A | * | 3/1883 | Pfau ...................... F16K 15/03 137/527.2 |
| 1,635,842 | A | | 7/1927 | Hirshstein |
| 4,164,958 | A | * | 8/1979 | Jaconette ............... F16K 15/03 137/527 |

OTHER PUBLICATIONS

International Search Report and Written Opinion dated Jul. 28, 2017, corresponding to Application No. PCT/US2017/023806.

* cited by examiner

*Primary Examiner* — Craig Schneider
*Assistant Examiner* — P. Macade Nichols
(74) *Attorney, Agent, or Firm* — Patterson & Sheridan, L.L.P.

(57) ABSTRACT

A check valve including a clevis, a hinge pin, a hinge configured to be rotatably coupled to the clevis by the hinge pin, and a disc configured to be detachably coupled to the hinge. The hinge includes a first hinge member having a male interlocking feature and a second hinge member defining a female interlocking feature corresponding to the male interlocking feature. The second hinge member is configured to be detachably coupled to the first hinge member. When the first hinge member is coupled to the second hinge member, the male interlocking feature of the first hinge member is received in the female interlocking feature defined in the second hinge member to prevent angular separation of the first and second hinge members about the hinge pin. The first and second hinge members may define a non-circular opening configured to prevent rotation of the disc relative to the hinge.

15 Claims, 8 Drawing Sheets

CHECK VALVE

FIELD

The present disclosure relates generally to swing-type check valves.

BACKGROUND

A variety of types of valves exist, including ball valves, butterfly valves, gate valves, choke valves, and check valves. The suitability of these types of valves for a particular application may depend, for instance, on the environment in which the valve will operate and/or the desired performance characteristics of the valve. Check valves are a type of non-return valve that allow fluid (e.g., a liquid or a gas) to flow in only one direction. Check valves are commonly used in a variety of industries and for a variety of applications, including industrial and domestic applications.

Conventional check valves include a body, a cover, a hinge, and a disc connected to the hinge. The disc is configured to move between an open position and a closed position in which the disc forms a seal with the seat of the body. However, many conventional check valves have discs that are configured to spin about their axes relative to the hinge, which renders these conventional check valves unsuitable for certain industries and applications. For instance, American Petroleum Institute (API) Standard 594 requires that the discs of check valves be restricted from rotating 360 degrees. Rotation of the disc relative to the hinge may cause the disc to prematurely wear, creating a misalignment of the disc and thereby creating a leak path between the disc and the seat of the body.

Additionally, API Standard 594 requires all of the components of the check valve in contact with the process fluid to have at least the same corrosion resistance as the body of the check valve. Conventional check valves that utilize fasteners (e.g., a nut, a washer, and a cotter pin) to secure the disc to the hinge, may not satisfy, or may have difficulty satisfying, this standard. For instance, it may be expensive, time-consuming to manufacture, and/or difficult to procure components, such as nuts, washers, and cotter pins, having at least the same level of corrosion resistance as the body of the check valve.

SUMMARY

The present disclosure is directed to various embodiments of a check valve. In one embodiment, the check valve includes a clevis, a hinge pin, a hinge configured to be rotatably coupled to the clevis by the hinge pin, and a disc configured to be detachably coupled to the hinge. The hinge includes a first hinge member (e.g., a left hinge member) including a male interlocking feature and a second hinge member (e.g., a right hinge member) defining a female interlocking feature corresponding to the male interlocking feature. The second hinge member is configured to be detachably coupled to the first hinge member. When the first hinge member is coupled to the second hinge member, the male interlocking feature of the first hinge member is received in the female interlocking feature defined in the second hinge member to prevent angular separation of the first and second hinge members about the hinge pin. The male interlocking feature of the first hinge member may have any suitable shape, such as a cylinder, a cylindrical segment, a rectangular prism, a trapezoidal prism, or a portion thereof. The male interlocking feature may be configured to be received in the female interlocking feature with a press fit connection. The male interlocking feature may be integral with a remainder of the first hinge member and the first hinge member may be monolithic. The male interlocking feature may be a locating pin separable from a remainder of the first hinge member. A first portion of the locating pin may be configured to be received in a receptacle defined in the first hinge member and a second portion of the locating pin may be configured to be received in the female interlocking feature defined in the second hinge member. The check valve may also include a second female interlocking feature defined in the first hinge member or the second hinge member and the other of the first hinge member or the second hinge member may include a second male interlocking feature. The second male interlocking feature is configured to be received in the second female interlocking feature when the first hinge member is coupled to the second hinge member. The disc may include a sealing portion, a retention portion spaced apart from the sealing portion, and a stem portion extending between the sealing portion and the retention portion. When the first hinge member is coupled to the second hinge member, the first hinge member and second hinge member may cooperate to define an opening configured to receive the stem portion of the disc. The retention portion may be integral with the stem portion of the disc, the sealing portion and the retention portion may each have a size larger than a size of the opening defined by the first and second hinge member, and when the disc is coupled to the hinge, the sealing portion and the retention portion of the disc may be on opposite sides of the hinge. The opening defined by the first and second hinge members may have a non-circular cross-sectional shape and the stem portion of the disc may have a non-circular cross-sectional shape. Engagement between the stem portion of the disc and the opening of the hinge may be configured to prevent rotation of the disc relative to the hinge.

A check valve according to another embodiment of the present disclosure includes a clevis, a hinge pin, a hinge configured to be rotatably coupled to the clevis by the hinge pin, and a disc configured to be detachably coupled to the hinge. The hinge defines an opening having a non-circular cross-sectional shape. The disc includes a sealing portion and a stem portion extending from the sealing portion. The stem portion includes a non-circular cross-sectional shape. When the disc is coupled to the hinge, the stem portion is received in the opening defined in the hinge. Engagement between the stem portion and the opening in the hinge is configured to prevent rotation of the disc about an axis of the disc relative to the hinge. The non-circular cross-sectional shape of the stem portion may include at least one flat surface and the non-circular cross-sectional shape of the opening in the hinge may include at least one flat surface. When the disc is coupled to the hinge, the at least one flat surface of the stem portion may be aligned with the at least one flat surface of the opening to prevent rotation of the disc relative to the hinge. The opening defined in the hinge and the stem portion of the disc may each have a truncated circular cross-sectional shape. The non-circular shape of the opening may be different than the non-circular shape of the stem portion of the disc. The stem portion may be configured to be received in the opening of the hinge in more than one orientation. The opening in the hinge may have any suitable non-circular cross-sectional shape, such as a prismatic shape, a non-prismatic shape, or an irregular shape. The hinge may include an arm and a connection member connected to the arm. When the disc is coupled to the hinge, the connection member may extend at least partially around the stem portion of the disc. The hinge may include a first hinge member and a second hinge member configured to be detachably coupled to the first hinge member. The first hinge member may include a male interlocking feature and the second hinge member may define a female interlocking feature configured to receive the male interlocking feature.

A check valve according to a further embodiment of the present disclosure includes a clevis, a hinge pin, a hinge configured to be rotatably coupled to the clevis by the hinge pin, and a disc configured to be detachably coupled to the hinge. The hinge defines an opening. The disc includes a sealing portion, a stem portion extending from the sealing portion, and at least one stop on the sealing portion. When the disc is coupled to the hinge, the stem portion of the disc extends through the opening defined by the hinge. When the disc rotates about an axis of the disc relative to the hinge, the at least one stop contacts the hinge to limit further rotation of the disc relative to the hinge. The disc may include a first stop and a second stop spaced apart from the first stop. The one or more stops may be integral with the disc or coupled to the disc (e.g., mechanically coupled to the disc).

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale, nor is every feature in the drawings necessarily required to fall within the scope of the described invention.

DETAILED DESCRIPTION

The present disclosure is directed to various embodiments of a swing-type check valve. The check valves according to various embodiments of the present disclosure include one or more anti-rotation features configured to prevent or at least restrict rotation of a disc about its axis relative to a hinge of the check valve. Additionally, the check valves according to various embodiments of the present disclosure include a two-piece hinge assembly with one or more features to prevent the two-piece hinge assembly from inadvertently separating from the assembled condition. The check valves of the present disclosure may be used in a variety of applications to restrict or constraint the direction of fluid flow (e.g., gas or liquid flow) through a pipe, such as, for instance, in the chemical or petro-chemical industry (e.g., an oil and gas refinery) or in any other suitable industries.

Figure 1A:
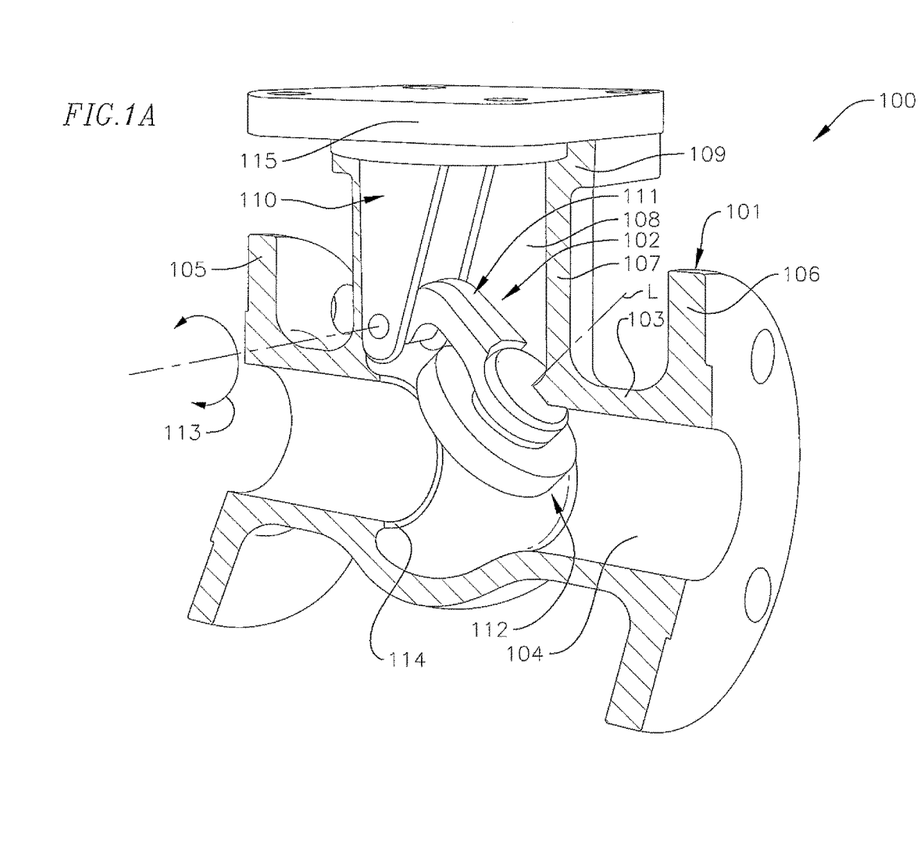
FIGS. 1A-1B are cross-sectional views of a check valve according to one embodiment of the present disclosure in an open position and a closed position, respectively.
Figure 1B:
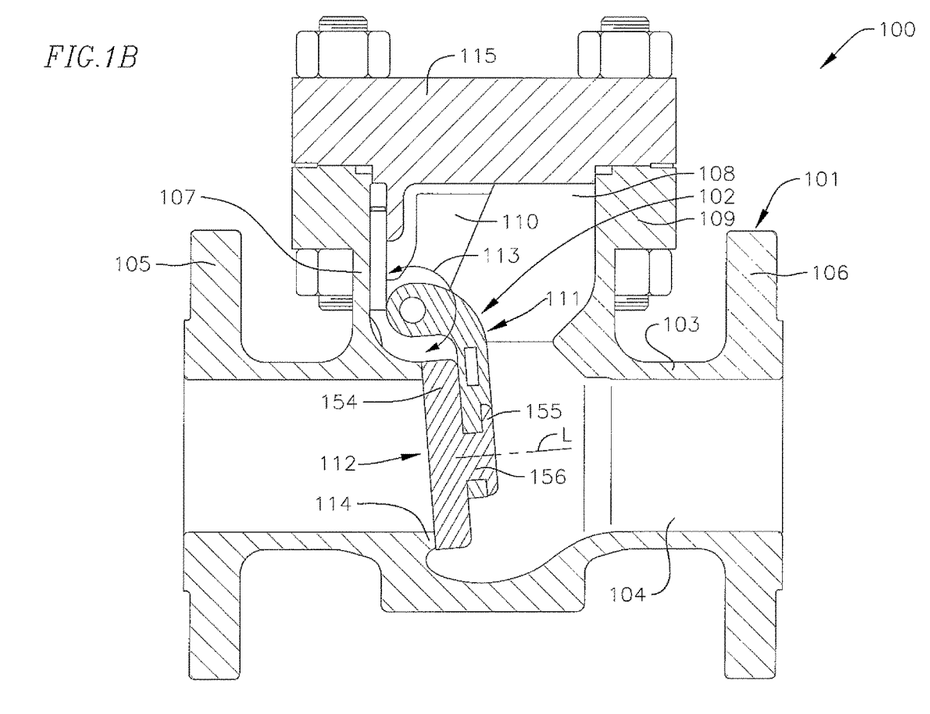

With reference now to FIGS. 1A-1B, a check valve 100 according to one embodiment of the present disclosure includes a valve body 101 and a valve assembly 102 housed in the valve body 101. In the illustrated embodiment, the valve body 101 includes at least one sidewall 103 defining a port or conduit 104 for the transportation of a fluid (e.g., gas or liquid) through the valve body 101. Additionally, in the illustrated embodiment, valve body 101 includes an inlet flange 105 at one end of the sidewall 103 and an outlet flange 106 at an opposite end of the sidewall 103. The inlet flange 105 is configured to connect to one end of a first pipe and the outlet flange 106 is configured to connect to one end of a second pipe such that the valve body 101 is configured to connect two adjacent pipes or pipe segments together.

Additionally, in the illustrated embodiment, the valve body 101 also includes at least one sidewall 107 defining an access port 108 in fluid communication with the conduit 104. In the illustrated embodiment, the access port 108 extends in a direction transverse to the direction in which the conduit 104 extends, although in one or more embodiments, the access port 108 may extend in any other suitable direction relative to the conduit 104. In the illustrated embodiment, the valve body 101 also includes an access port flange 109 at an outer end of the sidewall 107 defining the access port 108.

With continued reference to the embodiment illustrated in FIGS. 1A-1B, the valve assembly 102 extends down through the access port 108 and into the conduit 104. In the illustrated embodiment, the valve assembly 102 includes a clevis 110, a hinge 111 rotatably coupled to the clevis 110, and a disc 112 detachably coupled to the hinge 111. The hinge 111 and the disc 112 are configured to rotate (arrow 113) about the clevis 110 between an open position (FIG. 1A) and a closed position (FIG. 1B). When fluid (e.g., a gas or a liquid) flows through the conduit 104 in a first direction (e.g., to the right in FIGS. 1A-1B), the fluid flow is configured to rotate (arrow 113) the hinge 111 and the disc 112 into the open position (FIG. 1A). When the disc 112 is in the open position, the conduit 104 is at least partially unobstructed by the disc 112, which permits fluid to flow through the conduit 104. When fluid (e.g., a gas or a liquid) flows through the conduit 104 in a second direction opposite the first direction (e.g., to the left in FIGS. 1A-1B), the fluid flow is configured to rotate (arrow 113) the hinge 111 and the disc 112 into the closed position (FIG. 1B). When the disc 112 is in the closed position, the disc 112 completely obstructs or substantially completely obstructs the conduit 104 to prevent or at least restrict the flow of fluid through the conduit 104 in the second direction. Accordingly, the check valve 100 is a type of non-return valve (NRV) configured to permit fluid to flow through the valve body 101 in a first direction (e.g., to the right in FIGS. 1A-1B) and to prevent fluid flow in a second direction (e.g., to the left in FIGS. 1A-1B) opposite to the first direction:

In the illustrated embodiment, the valve body 101 also defines a seat 114 (e.g., an annular surface) configured to engage a portion of the disc 112 when the disc 112 is in the closed position. In one or more embodiments, the seat 114 may have any other suitable configuration, such as, for instance, an annular recess. The seat 114 is configured to form a seal with the disc 112 to prevent or substantially prevent flow through the conduit 104 of the valve body 101 in the second direction (e.g., to the left in FIGS. 1A-1B).

In the illustrated embodiment, the check valve 100 also includes a bonnet or a cover 115. In the illustrated embodiment, the cover 115 is a square member, although in one or more embodiments, the cover 115 may have any other suitable shape (e.g., circular). The cover 115 is configured to be detachably coupled to the access port flange 109. When the cover 115 is coupled to the access port flange 109, the cover 115 forms a seal around the access port flange 109 of the valve body 101 (e.g., by compressing a gasket between the cover 115 and the access port flange 109). Additionally, in the illustrated embodiment, the cover 115 is coupled to the clevis 110 (e.g., the clevis 110 is connected to a lower surface of the cover 115). Accordingly, in the illustrated embodiment, when the hinge 111 is rotatably coupled to the clevis 110 and the disc 112 is coupled to the hinge 111, the cover 115 supports the clevis 110, the hinge 111, and the disc 112.

Figure 2A:
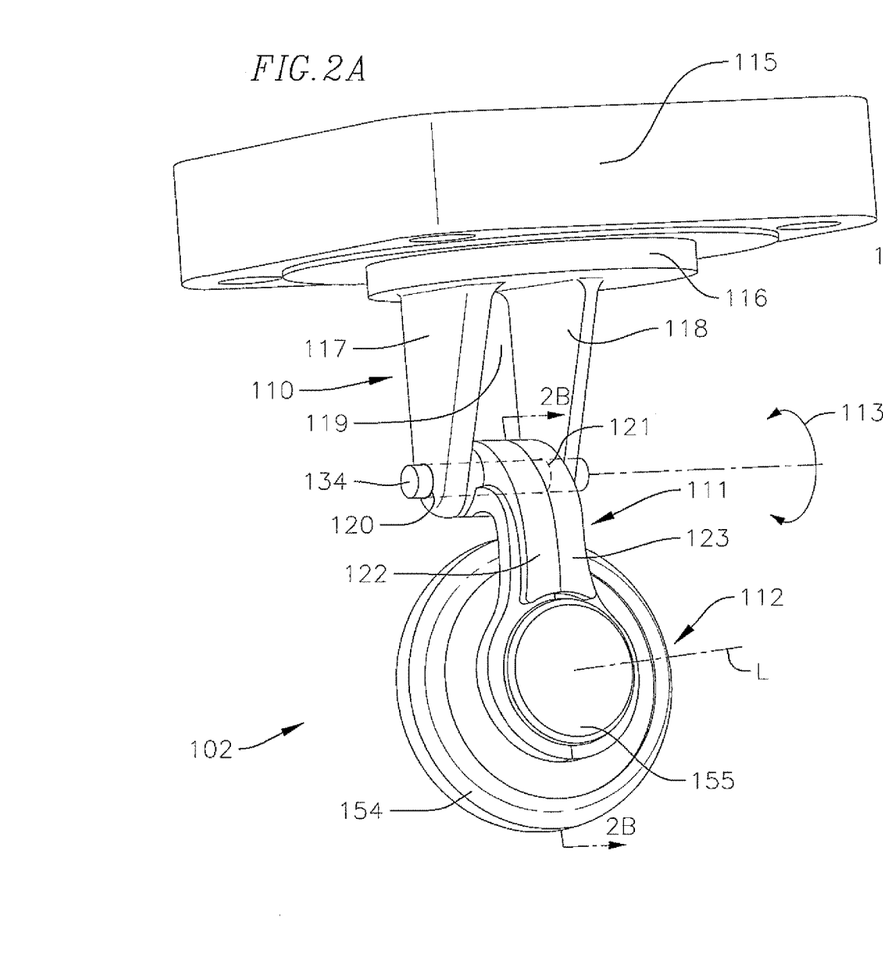
FIGS. 2A-2B are a perspective view and a cross-sectional view, respectively, of a hinge and a disc according to the embodiment of the check valve illustrated in FIGS. 1A-1B.
Figure 2B:
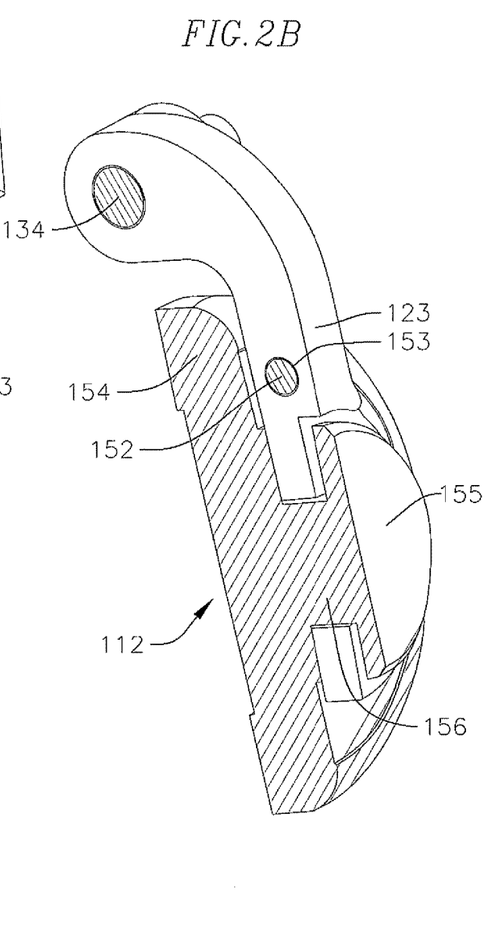

With reference now to FIGS. 2A-2B, the clevis 110 according to the illustrated embodiment includes a base 116 and a pair of forks 117, 118 extending down from the base 116. The base 116 of the clevis 110 is connected to the cover 115. In one or more embodiments, the clevis 110 may be detachably coupled to the cover 115 (e.g., by one or more fasteners). In one or more embodiments, the clevis 110 may be integral with the cover 115 (e.g., the cover 115 and the clevis 110 may be a monolithic member). In one or more embodiments, the clevis 110 may be provided without the base 116 and the forks 117, 118 may be connected directly to the cover 115. The forks 117, 118 of the clevis 110 are spaced apart by a gap 119 configured to receive or accommodate a portion of the hinge 111, as described in more detail below. Additionally, a lower end of each fork 117, 118 defines an opening (e.g., a hole) 120, 121, respectively. The opening 120 defined in one of the forks 117 is aligned with the opening 121 defined in the other fork 118.

With reference now to FIGS. 2A-3B, the hinge 111 in the illustrated embodiment is an assembly including a first hinge member 122 (e.g., a left hinge member) and a second hinge member 123 (e.g., a right hinge member) configured to be detachably coupled to the first hinge member 122. Although the hinge members are referred to hereinafter as a left hinge member 122 and a right hinge member 123, this terminology is adopted for ease of reference only, and a person of ordinary skill in the art will appreciate that the hinge 111 is not limited to any particular orientation. Instead, depending on the orientation of the valve body 101 and/or the orientation of the valve assembly 102 in the valve body 101, the hinge members 122, 123 may have any other spatial relationship to each other (e.g., the first hinge member 122 may be an upper hinge member and the second hinge member 123 may be a lower hinge member). The left and right hinge members 122, 123 are configured to be coupled together around the disc 112 to couple the disc 112 to the hinge 111. In the illustrated embodiment, the left and right hinge members 122, 123 each include an arm 124, 125 having a proximal end 126, 127 and a distal end 128, 129, respectively. Additionally, each hinge member 122, 123 includes a connection member 130, 131 at the distal end 128, 129 of the arm 124, 125, respectively. In the illustrated embodiment, the arm 124, 125 and the connection member 130, 131 of each hinge member 122, 123 are integral, although in one or more embodiments, the connection members 130, 131 may be separate components configured to be coupled to the arms 124, 125, respectively, by any suitable mechanism (e.g., one or more fasteners). In the illustrated embodiment, the proximal end 126, 127 of each arm 124, 125 defines an opening 132, 133 extending in a transverse direction. The openings 132, 133 in the hinge members 122, 123 are configured to align and receive a clevis pin 134 rotatably coupling the hinge 111 to the clevis 110, as illustrated in FIG. 2A. The clevis pin 134 extends through the opening 120 in one of the forks 117, through the openings 132, 133 in the left and right hinge members 122, 123, and through the opening 121 in the other fork 118 to rotatably (arrow 113) couple the hinge 111 to the clevis 110. Although in the illustrated embodiment the arm 124, 125 of each hinge member 122, 123 is curved, in one or more embodiments, the arm 124, 125 of each hinge member 122, 123 may be straight or substantially straight. Additionally, in one or more embodiments, the arms 124, 125 of the hinge members 122, 123 may have varying cross-sectional shapes along their length.

With continued reference to the embodiment illustrated in FIGS. 2A-3B, the connection member 130, 131 of each hinge member 122, 123 is curved (e.g., arcuate). In the illustrated embodiment, the connection members 130, 131 of the hinge member 122, 123 are semi-annular (e.g., semi-circular). In one or more embodiments, the connection members 130, 131 may have any other suitable shape. Additionally, in the illustrated embodiment, each connection member 130, 131 defines a notch 135, 136, respectively. In the illustrated embodiment, each notch 135, 136 is defined by a straight inner wall segment 137, 138 and a curved inner wall segment 139, 140 extending from an outer end of the straight inner wall segment 137, 138, respectively. When the left and right hinge members 122, 123 are brought together to form the hinge 111, the notches 135, 136 in the left and right hinge members 122, 123 cooperate to define an opening 141 (see FIG. 3A) in the hinge 111 that is configured to receive or accommodate a portion of the disc 112, as described in more detail below.

Still referring to the embodiment illustrated in FIGS. 2A-3B, the opening 141 defined in the hinge 111 has a non-circular shape configured to prevent rotation of the disc 112 (e.g., about an axis of the disc 112) relative to the hinge 111. In the illustrated embodiment, the opening 141 has a truncated circular cross-sectional shape. As best illustrated in FIG. 3A, the truncated circular cross-sectional shape of the opening 141 defined by the hinge 111 includes a curved portion (e.g., a curved surface) 142 defined by the curved inner wall segments 139, 140 of the notches 135, 136 and a straight segment (e.g., a flat surface) 143 defined by the straight inner wall segments 137, 138 of the notches 135, 136. Although in the illustrated embodiment the opening 141 defined in the hinge 111 includes a single flat surface 143, in one or more embodiments, the opening 141 may include any other suitable number of flat surfaces, such as, for instance, two or more flat surfaces. Furthermore, although in the illustrated embodiment the flat surface 143 of the opening 141 in the hinge 111 is located along an upper end of the opening 141, in one or more embodiments, the flat surface 143 may have any other suitable position along the opening 141 (e.g., the flat surface 143 of the opening 141 in the hinge 111 may be located along a lower end of the opening 141 or along one of the sides of the opening 141). Additionally, in one or more embodiments, the opening 141 defined in the hinge 111 may have any other suitable non-circular shape, such as, for instance, a polygonal cross-sectional shape (e.g., a square, a pentagonal, or a hexagonal cross-sectional shape) or an elliptical shape. Additionally, in one or more embodiments, the opening 141 defined in the hinge 111 may have an irregular shape (e.g., a non-axisymmetric shape). Although in the illustrated embodiment, the connection member 130 of the left hinge member 122 has the same shape as the connection member 131 of the right hinge member 123, in one or more embodiments, the connection members 130, 131 of the left and right hinge members 122, 123 may have different shapes. For instance, in one or more embodiments, the shape of the notch 135 defined in the left hinge member 122 may be different than the shape of the notch 136 defined in the right hinge member 123. In one or more embodiments, only one of the notches 135, 136 may contribute to the non-circularity of the opening 141. For instance, in one or more embodiments, one of the notches 135, 136 may be semi-circular and the other notch 135, 136 may have a non-semi-circular shape (e.g., a truncated semi-circular shape).

Figures 3A, 3B:
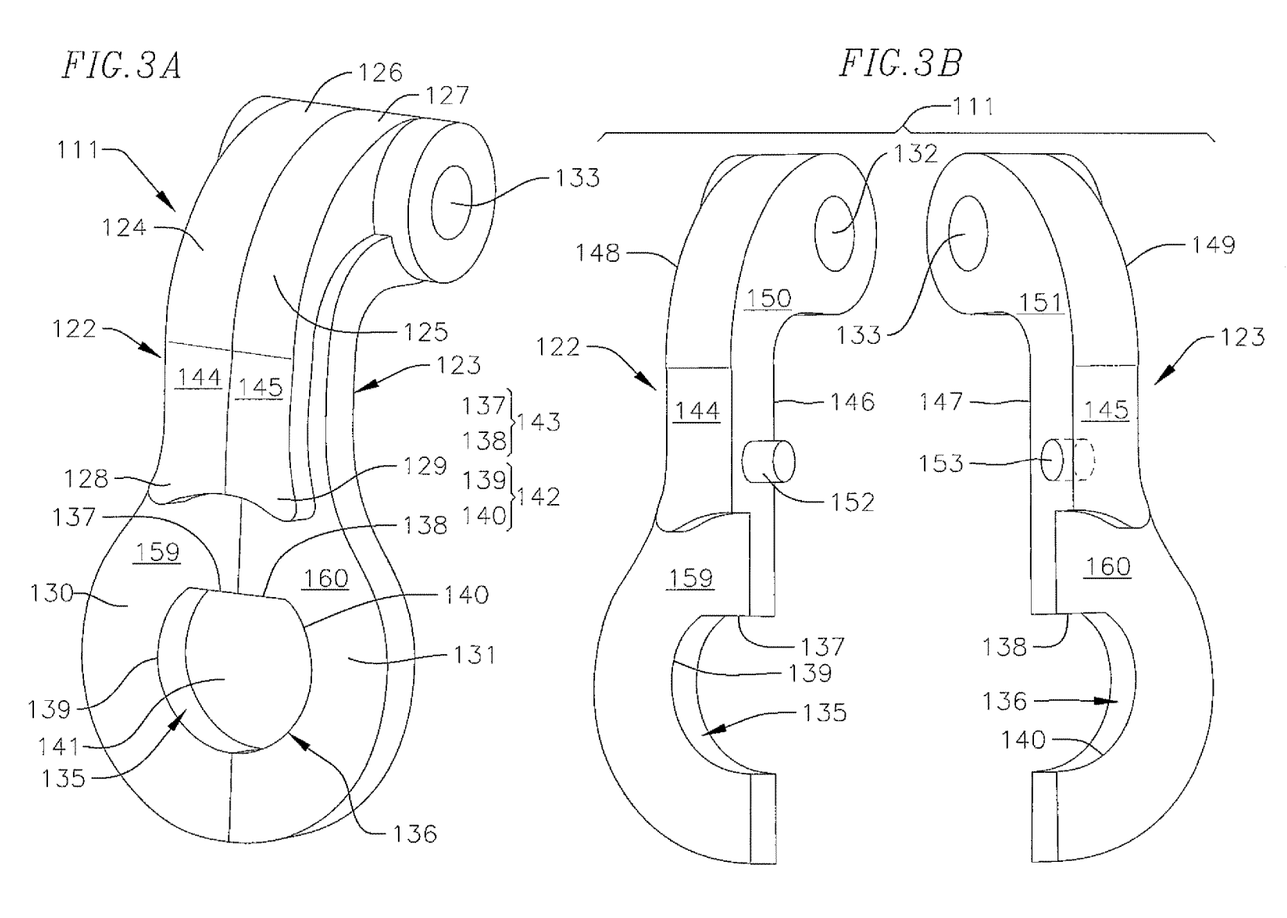
FIGS. 3A-3B are an assembled perspective view and an exploded perspective view, respectively, of the hinge according to the embodiment of the check valve illustrated in FIGS. 1A-1B.

With reference now to the embodiment illustrated in FIG. 3B, the left and right hinge members 122, 123 each include an upper surface 144, 145, respectively, and a lower surface 146, 147, respectively. Additionally, the left and right hinge members 122, 123 each include an outer surface 148, 149, respectively, and an inner interface surface 150, 151, respectively, extending from the upper surface 144, 145 to the lower surface 146, 147, respectively. The interface surface 150 of the left hinge member 122 is configured to abut (e.g., contact or engage) the interface surface 151 of the right hinge member 123 when the hinge bodies 122, 123 are coupled together. Additionally, in the illustrated embodiment, the left hinge member 122 includes a male interlocking feature (e.g., a projection) 152 extending from the interface surface 150 of the left hinge member 122 and the right hinge member 123 defines a corresponding female interlocking feature (e.g., a recess) 153 in the interface surface 151 of the right hinge member 123 that is configured to receive at least a portion of the male interlocking feature 152 of the left hinge member 122 (e.g., the male interlocking feature 152 of the left hinge member 122 is configured to mate with the female interlocking feature 153 defined in the right hinge member 123). In the illustrated embodiment, the male interlocking feature 152 has a cylindrical shape and the female interlocking feature 153 has a corresponding cylindrical shape. In one or more embodiments, the male interlocking feature 152 and the female interlocking feature 153 may have any other suitable shapes, such as, for instance, a prismatic shape, any other suitable non-prismatic shape, or combinations or portions thereof. Additionally, although in the illustrated embodiment the hinge 111 includes a single male interlocking feature 152 and a single female interlocking feature 153, in one or more embodiments, the hinge 111 may include any other suitable number of male interlocking features and corresponding female interlocking features, such as, for instance, two or more male interlocking features and two or more corresponding female interlocking features. Each pair of male and female interlocking features may be configured identically (e.g., the same size and shape) or they may have different configurations (e.g., one pair of male and female interlocking features may have a circular cross-sectional shape and another pair of male and female interlocking features may have a polygonal cross-sectional shape). Additionally, although in the illustrated embodiment the left hinge member 122 includes the male interlocking feature 152 and the right hinge member 123 includes the corresponding female interlocking feature 153, in one or more embodiments, the left hinge member 122 may include the female interlocking feature 153 and the right hinge member 123 may include the male interlocking feature 152.

In one or more embodiments, the male interlocking feature 152 of the left hinge member 122 is configured to be received in the female interlocking feature 153 defined in the right hinge member 123 with a press fit (i.e., a friction fit) connection. In one or more embodiments, the male interlocking feature 152 of the left hinge member 122 may be configured to be received in the female interlocking feature 153 defined in the right hinge member 123 with any other suitable fit, such as, for instance, a clearance fit or a location fit connection. Additionally, in one or more embodiments, the male interlocking feature 152 may be integral with the left hinge member 122 (e.g., the left hinge member 122 may be monolithic). In one or more embodiments, the male interlocking feature 152 may be separately formed from the left hinge member 122 and may be coupled to the left hinge member 122 by any suitable process. For instance, in one or more embodiments, the interface surface 150 of the left hinge member 122 may define a receptacle (e.g., a bore) configured to receive a portion of the male interlocking feature 152. For instance, in one or more embodiments, the male interlocking feature 152 may be a separate member, such as a locating pin, configured to be received in corresponding openings in the interface surfaces 150, 151 of the first and second hinge bodies 122, 123.

The engagement between the male interlocking feature 152 and the corresponding female interlocking feature 153 is configured to prevent or at least limit (e.g., minimize) rotation of the left hinge member 122 relative to the right hinge member 123. For instance, in one or more embodiments, the engagement between the male interlocking feature 152 and the corresponding female interlocking feature 153 is configured to prevent or at least limit the left and right hinge members 122, 123 from differentially rotating (arrow 113) about the clevis 110 (e.g., about the clevis pin 134 extending through the openings 132, 133 in the hinge members 122, 123) into different angular positions. Preventing or at least limiting rotation of the left and right hinge members 122, 123 relative to each other is configured to mitigate the potential for the left and right hinge members 122, 123 to rotationally or angularly separate from each other. Otherwise, the angular separation of the left and right hinge members 122, 123 from each other may cause or allow the disc 112 to inadvertently detach from the hinge 111.

Figure 4:
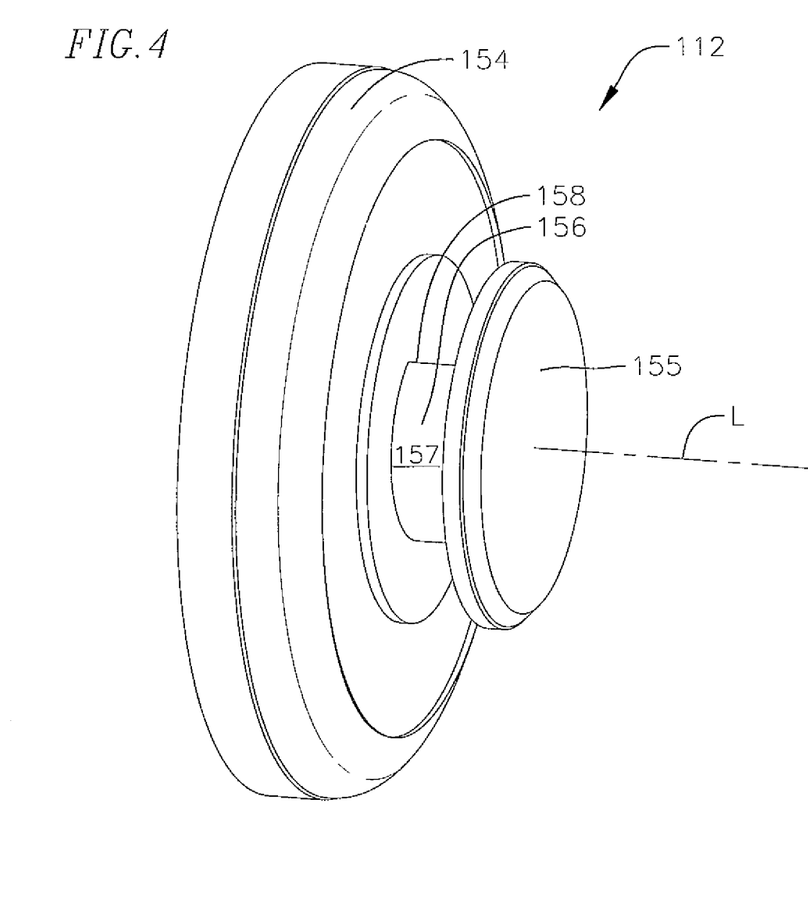
FIG. 4 is a perspective view of a disc according to the embodiment of the check valve illustrated in FIGS. 1A-1B.

With reference now to FIG. 4, the disc 112 in the illustrated embodiment includes a sealing portion 154, a retention portion 155 spaced apart from the sealing portion 154, and a stem portion 156 (e.g., an interconnecting portion) extending from the sealing portion 154 to the retention portion 155. In the illustrated embodiment, the sealing portion 154 has a circular cross-sectional shape. When the disc 112 is in the closed position (FIG. 1B), the sealing portion 154 of the disc 112 is configured to engage the seat 114 of the valve body 101 and completely obstruct or substantially completely obstruct the conduit 104 defined in the valve body 101 to restrict the flow of fluid through the conduit 104 in one direction. Although the portion of the disc 112 that engages the seat 114 of the valve body 101 is referred to herein as a "sealing portion," it will be appreciated by a person of ordinary skill in the art that the sealing portion 154 of the disc 112 may not create a perfect seal with the seat 114 of the valve body 101 due to, for instance, manufacturing tolerances of the various components of the check valve 100 and/or the operating conditions under which the check valve 100 is operated. In one or more embodiments, the sealing portion 154 of the disc 112 may have any other suitable configuration depending, for instance, on the cross-sectional size and shape of the conduit 104 defined in the valve body 101. Additionally, in the illustrated embodiment, the retention portion 155 of the disc 112 has a circular cross-sectional shape, although in one or more embodiments, the retention portion 155 may have any other suitable cross-sectional shape.

With continued reference to the embodiment illustrated in FIG. 4, the stem portion 156 (e.g., the interconnecting portion) of the disc 112 has a non-circular cross-sectional shape. As described in more detail below, the non-circular cross-sectional shape of the stem portion 156 is configured to prevent or at least limit rotation of the disc 112 relative to the hinge 111. Although in the illustrated embodiment the entire length or substantially the entire length of the stem portion 156 has a non-circular cross-sectional shape, in one or more embodiments, only a portion of the length of the stem portion 156 may have a non-circular cross-sectional shape. In the illustrated embodiment, the stem portion 156 has a truncated circular cross-sectional shape. The truncated circular cross-sectional shape includes a curved portion (e.g., a curved surface) 157 and a straight segment (e.g., a flat surface) 158. Although in the illustrated embodiment the stem portion 156 of the disc 112 includes a single flat surface, in one or more embodiments, the stem portion 156 may include any other suitable number of flat surfaces 158, such as, for instance, two or more flat surfaces. Additionally, in one or more embodiments, the stem portion 156 of the disc 112 may have any other suitable non-circular shape, such as, for instance, a polygonal cross-sectional shape (e.g., a square, a pentagonal, or a hexagonal cross-sectional shape), an elliptical shape, or combinations thereof. Additionally, in one or more embodiments, the stem portion 156 of the disc 112 may have an irregular shape (e.g., a non-axisymmetric shape). Additionally, in the illustrated embodiment, the stem portion 156 of the disc 112 has the same or similar cross-sectional shape as the opening 141 (see FIG. 3A) defined in the hinge 111 (e.g., the cross-sectional shape of the stem portion 156 of the disc 112 corresponds to the cross-sectional shape of the opening 141 defined in the hinge 111). In one or more embodiments, the cross-sectional shape of the stem portion 156 of the disc 112 may be different than the cross-sectional shape of the opening 141 defined in the hinge 111.

To assemble the valve assembly 102, the left and right hinge members 122, 123 may be brought together around the stem portion 156 of the disc 112. As the hinge members 122, 123 are brought together, the male interlocking feature 152 (e.g., the projection) on the left hinge member 122 extends into the female interlocking feature 153 (e.g., the recess) defined in the right hinge member 123. In one or more embodiments, the left and right hinge members 122, 123 may be brought together until the interface surface 150 of the left hinge member 122 contacts the interface surface 151 of the right hinge member 123. In one or more embodiments, the male interlocking feature 152 (e.g., the projection) on the left hinge member 122 may be received in the female interlocking feature 153 (e.g., the recess) in the right hinge member 123 with a press fit (i.e., a friction fit), a clearance fit, or a location fit connection. As described above, the engagement between the male interlocking feature 152 (e.g., the projection) on the left hinge member 122 and the female interlocking feature 153 (e.g., the recess) defined in the right hinge member 123 is configured to prevent the left and right hinge members 122, 123 from rotating relative to each other about the clevis 110 (e.g., the clevis pin 134) and thereby angularly separating, which could cause or allow the disc 112 to inadvertently detach from the hinge 111 (e.g., the engagement between the male and female interlocking features 152, 153 is configured to prevent the left and right hinge members 122, 123 from differentially rotating (arrow 113) about the clevis pin 134).

Additionally, the hinge bodies 122, 123 may be brought together around the stem portion of the disc 112 such that the connection members 130, 131 of the hinge bodies 122, 123 extend around the stem portion 156 of the disc 112. Although in the illustrated embodiment the connection members 130, 131 are configured to cooperate to extend completely or substantially completely around the stem portion 156 of the disc 112, in one or more embodiments, the connection members 130, 131 may be configured not to extend completely around the stem portion 156 of the disc 112. Additionally, the disc 112 may be oriented such that the non-circular shape of the stem portion 156 is properly aligned with the non-circular shape of the opening 141 defined in the hinge 111 as the hinge bodies 122, 123 are brought together around the stem portion 156 of the disc 112. For instance, in the illustrated embodiment, the disc 112 may be oriented (e.g., rotated) such that the flat surface 158 of the stem portion 156 is aligned with the straight inner wall segments 137, 138 of the hinge bodies 122, 123 as the hinge bodies 122, 123 are brought together around the stem portion 156 of the disc 112. Accordingly, once the left and right hinge members 122, 123 have been brought together to form the hinge 111 and the stem portion 156 of the disc 112 is received in the opening 141 defined in the hinge 111, the flat surface 158 of the stem portion 156 is aligned with the straight segment (e.g., the flat surface) 143 of the opening 141 defined in the hinge 111 and the curved portion (e.g., the curved surface) 157 of the stem portion 156 is aligned with the curved portion (e.g., the curved surface) 142 of the opening 141 defined in the hinge 111. The engagement between the flat surface 158 of the stem portion 156 and the flat surface 143 of the opening 141 defined in the hinge 111 is configured to prevent rotation (e.g., spinning) of the disc 112 relative to the hinge 111. In the illustrated embodiment, the engagement is configured to prevent rotation of the disc 112 about a longitudinal axis L (see FIG. 2A) of the stem portion 156 of the disc 112. Accordingly, in the illustrated embodiment, the disc 112 is keyed to the hinge 111. As described above, the opening in the hinge 111 and the stem portion of the disc 112 may have a variety of other non-circular shapes configured to prevent or at least limit rotation of the disc 112 relative to the hinge 111.

Otherwise, rotation (e.g., spinning) of the disc 112 relative to the hinge 111 when the disc 112 is in the closed position (FIG. 1B) may cause the sealing portion 154 of the disc 112 to prematurely wear due to the friction between the seat 114 of the valve body 101 and the sealing portion 154 of the disc 112. Premature wear of the sealing portion 154 of the disc 112 may create a gap between the sealing portion 154 of the disc 112 and the seat 114 of the valve body 101 that may create a leak path allowing fluid (e.g., gas or liquid) to flow past the sealing portion 154 of the disc 112 in the second direction (e.g., to the left in FIG. 1B) when the disc 112 is in the closed position.

When the disc 112 is coupled to the hinge 111, the sealing portion 154 and the retention portion 155 of the disc 112 are on opposite sides of the hinge 111. In the illustrated embodiment, the retention portion 155 of the disc 112 is received in recesses 159, 160 (see FIGS. 3A-3B) in the upper surfaces 144, 145, respectively, of the hinge 111, the stem portion 156 (e.g., the interconnecting portion) of the disc 112 extends through the opening 141 in the hinge 111, and the sealing portion 154 of the disc 112 is on or below the lower surfaces 146, 147 of the hinge 111. In one or more embodiments, the hinge 111 may be provided without the recesses 159, 160 and the retention portion 155 of the disc 112 may be configured to engage the upper surfaces 144, 145 of the hinge 111 when the disc 112 is connected to the hinge 111. In the illustrated embodiment, the sealing portion 154 and the retention portion 155 of the disc 112 each have a size (e.g., an outer diameter) larger than the size of the opening 141 defined in the hinge 111. Because the retention portion 155 of the disc 112 is larger than the opening 141 defined in the hinge 111, the retention portion 155 of the disc 112 is configured to prevent the disc 112 from inadvertently disengaging the hinge 111 (e.g., the retention portion 155 of the disc 112 is configured to engage the recesses 159, 160 in the upper surfaces 144, 145 of the hinge 111 to prevent the stem portion 156 of the disc 112 from inadvertently sliding out of the opening 141 defined in hinge 111).

In the illustrated embodiment, the sealing portion 154, the stem portion 156 (e.g., the interconnecting portion), and the retention portion 155 of the disc 112 are integral (e.g., the disc 112 is a monolithic member). The monolithic disc 112 facilitates attaching the disc 112 to the hinge 111 without additional components, such as nuts, washers, and cotter pins. That is, in the illustrated embodiment, the retention portion 155, which is an integral portion of the monolithic disc 112, is configured to retain the disc 112 connected to the hinge 111 in the manner described above without the need for a nut, a washer, and a cotter pin.

Additionally, the monolithic disc 112 facilitates compliance with American Petroleum Institute (API) Standard 594, which requires that each component of the valve assembly 102 have at least the same level or degree of corrosion resistance as the valve body 101. Accordingly, in one or more embodiments, the monolithic disc 112 may be formed out of a material having a corrosion resistance equal to or greater than the corrosion resistance of the valve body 101. Otherwise, the additional components used to secure the disc 112 to the hinge 111, such as a nut and a washer, must be made out of a material having at least the same corrosion resistance as the valve body 101, which may be expensive to manufacture or procure.

As described above, in the illustrated embodiment, the retention portion 155 of the disc 112 is larger than the opening 141 defined in the hinge 111 and the disc 112 is a monolithic member (e.g., the sealing portion 154, the stem portion 156, and the retention portion 155 of the disc 112 are integral). Accordingly, the two-piece hinge 111 (e.g., the left and right hinge members 122, 123) facilitates connecting the hinge 111 to the disc 112. That is, the two-piece hinge 111 facilitates attaching the hinge 111 to the disc 112 by bringing the left and right hinge bodies 122, 123 together around the stem portion 156 of the disc 112. Otherwise, the integral retention portion 155 of the disc 112, which is larger than the opening 141 in the hinge 111, may prevent connecting the disc 112 to the hinge 111.

In one or more alternate embodiments, the retention portion 155 of the disc 112 may be configured to be detachably coupled to the stem portion 156 of the disc 112. For instance, in one or more embodiments, the detachable retention portion 155 of the disc 112 may include an externally threaded shank configured to be threaded into an internally threaded bore in the stem portion 156 of the disc 112. In one or more embodiments, the detachable retention portion 155 of the disc 112 may include an internally threaded bore configured to receive an externally threaded shank on the stem portion 156 of the disc 112. In one or more embodiments, the detachable retention portion 155 may be a nut and at least a portion of the stem portion 156 may include external threads configured to be engaged by the nut. The nut may be further secured to the stem portion 156 by using a cotter pin extending through the thickness of the nut. Additionally, in one or more embodiments in which the retention portion 155 of the disc 112 is detachable, the hinge 111 may be a single monolithic component. In an embodiment in which the hinge 111 is a single monolithic component, the disc 112 may be coupled to the hinge 111 by detaching the retention portion 155 of the disc 112 from the stem portion 156, inserting the stem portion 156 of the disc 112 into the opening 141 defined in the hinge 111, and attaching the retention portion 155 to the stem portion 156 to secure the disc 112 to the hinge 111.

Once the hinge members 122, 123 have been brought together around the stem portion 156 of the disc 112 to couple the hinge 111 to the disc 112, the hinge 111 and the disc 112 may be rotatably (arrow 113) coupled to the clevis 110 by inserting the proximal end of the hinge 111 into the gap 119 between the forks 117, 118 of the clevis 110 and aligning the openings 132, 133 in the hinge 111 with the openings 120, 121 in the forks 117, 118. The hinge 111 may then be rotatably coupled to the clevis 110 by inserting the clevis pin 134 through the opening 120 in one of the forks 117, through the openings 132, 133 in the proximal end of the hinge 111, and through the opening 121 in the other fork 118. The clevis pin 134 may be secured to the clevis 110 and the hinge 111 by a cotter pin or any other suitable mechanism.

Once the hinge 111 and the disc 112 are rotatably coupled to the clevis 110, the valve assembly 102 (e.g., the clevis 110, the hinge 111, and the disc 112) may be inserted into the access port 108 of the valve body 101 such that the disc 112 extends down into the conduit 104 of the valve body 101. The cover 115 may then be coupled to the access port flange 109 to form a seal around the outer end of the access port 108 (e.g., by compressing a gasket between the cover 115 and the access port flange 109). In one or more embodiments in which the clevis 110 is a separate component from the cover 115, the clevis 110 may be coupled to the cover 115 (e.g., by fasteners) before inserting the valve assembly 102 into the access port 108 of the valve body 101. Once the valve assembly 102 is housed in the valve body 101, the valve assembly 102 is configured to rotate (arrow 113) between an open position (FIG. 1A) to permit fluid to flow in a first direction through the conduit 104 and a closed position (FIG. 1B) to prevent or substantially prevent fluid from flowing in a second direction through the conduit 104.

FIGS. 5-8 depict hinges according to alternate embodiments of the present disclosure. The hinges may be the same as or similar to the embodiment of the hinge described above with reference to FIGS. 1A-3B except for the configuration of the male and female features of the left and right hinge members that are configured to prevent the left and right hinge members from rotationally separating from each other.

Figures 5, 6:
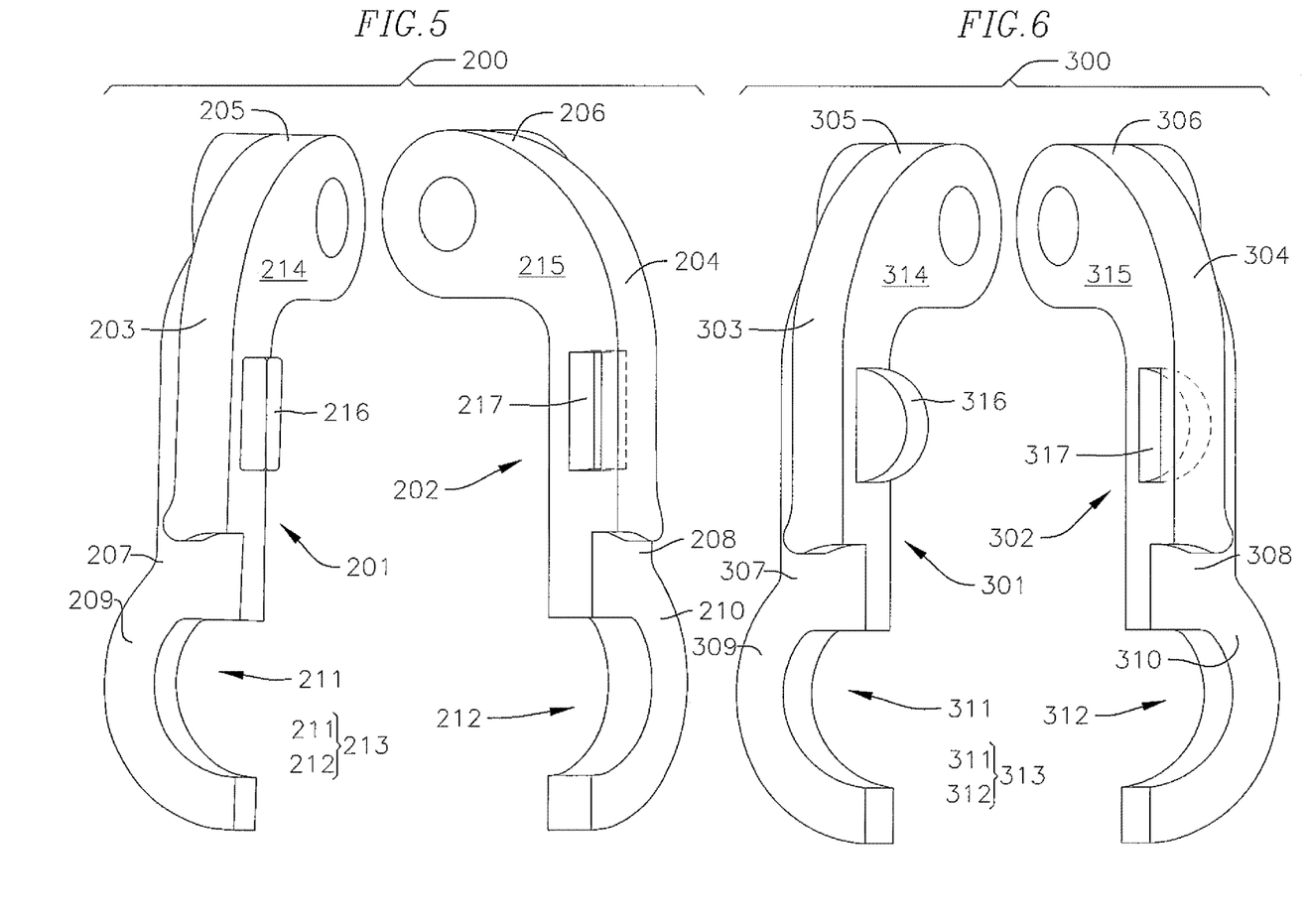
FIG. 5 is an exploded perspective view of a hinge according to another embodiment of the present disclosure.
FIG. 6 is an exploded perspective view of a hinge according to another embodiment of the present disclosure.

With reference now to FIG. 5, a hinge 200 according to one embodiment of the present disclosure includes a first hinge member 201 (e.g., a left hinge member) and a second hinge member 202 (e.g., a right hinge member) configured to be detachably coupled to the first hinge member 201. Each hinge member 201, 202 includes an arm 203, 204 having a proximal end 205, 206 and a distal end 207, 208 and a connection member 209, 210 extending from the distal end 207, 208 of the arm 203, 204. Additionally, each connection member 209, 210 defines a notch 211, 212. Together, the notches 211, 212 in the left and right hinge members 201, 202 define an opening 213 having a non-circular cross-sectional shape. The configuration of the arms 203, 204, the connection members 209, 210, and the notches 211, 212 defined by the connection members 209, 210 may be the same or similar to any of the configurations of the arms 124, 125, the connection members 130, 131, and the notches 135, 136 described above with reference to embodiment of the hinge 111 illustrated in FIGS. 1A-3B.

Additionally, in the illustrated embodiment, each of the arms 203, 204 defines an interface surface 214, 215, respectively. The interface surface 214 of the left hinge member 201 is configured to abut (e.g., contact or engage) the interface surface 215 of the right hinge member 202 when the hinge members 201, 202 are coupled together to form the hinge 200. In the illustrated embodiment, the left hinge member 201 includes a male interlocking feature 216 (e.g., a projection) extending from the interface surface 214 of the left hinge member 201 and the right hinge member 202 defines a corresponding female interlocking feature 217 (e.g., a recess) in the interface surface 215 of the right hinge member 202 that is configured to receive at least a portion of the male interlocking feature 216 of the left hinge member 201 (e.g., the male interlocking feature 216 of the left hinge member 201 is configured to mate with the female interlocking feature 217 defined in the right hinge member 202). In the illustrated embodiment, the male interlocking feature 216 of the left hinge member 201 has a rectangular prismatic shape and the female feature 217 defined in the interface surface 215 of the right hinge member 202 has a corresponding rectangular prismatic shape. The male interlocking feature 216 of the left hinge member 201 may be configured to be received in the female interlocking feature 217 in the right hinge member 202 with a press fit (i.e., a friction fit), a clearance fit, or a location fit connection. Although in the illustrated embodiment the left hinge member 201 includes the male interlocking feature 216 and the right hinge member 202 includes the corresponding female interlocking feature 217, in one or more embodiments, the left hinge member 201 may include the female interlocking feature 217 and the right hinge member 202 may include the male interlocking feature 216. In one or more embodiments, the male interlocking feature 216 may be integral with the left hinge member 201. In one or more embodiments, the male interlocking feature 216 may be separately formed from the left hinge member 201 and may be coupled to the left hinge member 201 by any suitable process. For instance, in one or more embodiments, the interface surface 214 of the left hinge member 201 may define a receptacle (e.g., a slot) configured to receive a portion of the male interlocking feature 216. In the same or substantially the same manner as described above, the engagement between the male interlocking feature 216 and the corresponding female interlocking feature 217 when the left and right hinge members 201, 202 are brought together is configured to prevent the left hinge member 201 from rotationally separating from the right hinge member 202.

With reference now to FIG. 6, a hinge 300 according to one embodiment of the present disclosure includes a first hinge member 301 (e.g., a left hinge member) and a second hinge member 302 (e.g., a right hinge member) configured to be detachably coupled to the first hinge member 301. Each hinge member 301, 302 includes an arm 303, 304 having a proximal end 305, 306 and a distal end 307, 308 and a connection member 309, 310 extending from the distal end 307, 308 of the arm 303, 304. Additionally, each connection member 309, 310 defines a notch 311, 312. Together, the notches 311, 312 in the left and right hinge members 301, 302 define an opening 313 having a non-circular cross-sectional shape. The configuration of the arms 303, 304, the connection members 309, 310, and the notches 311, 312 defined by the connection members 309, 310 may be the same or similar to any of the configurations of the arms 124, 125, the connection members 130, 131, and the notches 135, 136 described above with reference to embodiment of the hinge 111 illustrated in FIGS. 1A-3B.

Additionally, in the illustrated embodiment, each of the arms 303, 304 defines an interface surface 314, 315, respectively. The interface surface 314 of the left hinge member 301 is configured to abut (e.g., contact or engage) the interface surface 315 of the right hinge member 302 when the hinge members 301, 302 are coupled together to form the hinge 300. In the illustrated embodiment, the left hinge member 301 includes a male interlocking feature 316 (e.g., a projection) extending from the interface surface 314 of the left hinge member 301 and the right hinge member 302 defines a corresponding female interlocking feature 317 (e.g., a recess) in the interface surface 315 of the right hinge member 302 that is configured to receive at least a portion of the male interlocking feature 316 of the left hinge member 301 (e.g., the male interlocking feature 316 of the left hinge member 301 is configured to mate with the female interlocking feature 317 defined in the right hinge member 302). In the illustrated embodiment, the male interlocking feature 316 of the left hinge member 301 has a cylindrical segment shape (e.g., a semi-cylindrical shape) and the female interlocking feature 317 defined in the interface surface 315 of the right hinge member 302 has a corresponding cylindrical segment shape (e.g., a semi-cylindrical shape). The male interlocking feature 316 of the left hinge member 301 may be configured to be received in the female interlocking feature 317 in the right hinge member 302 with a press fit (i.e., a friction fit), a clearance fit, or a location fit connection. Although in the illustrated embodiment the left hinge member 301 includes the male interlocking feature 316 and the right hinge member 302 includes the corresponding female interlocking feature 317, in one or more embodiments, the left hinge member 301 may include the female interlocking feature 317 and the right hinge member 302 may include the male interlocking feature 316. In one or more embodiments, the male interlocking feature 316 may be integral with the left hinge member 301. In one or more embodiments, the male interlocking feature 316 may be separately formed from the left hinge member 301 and may be coupled to the left hinge member 301 by any suitable process. For instance, in one or more embodiments, the interface surface 314 of the left hinge member 301 may define a receptacle (e.g., a slot) configured to receive a portion of the male interlocking feature 316. In the same or substantially the same manner as described above, the engagement between the male interlocking feature 316 and the corresponding female interlocking feature 317 when the left and right hinge members 301, 302 are brought together is configured to prevent the left hinge member 301 from rotationally separating from the right hinge member 302.

Figure 7:
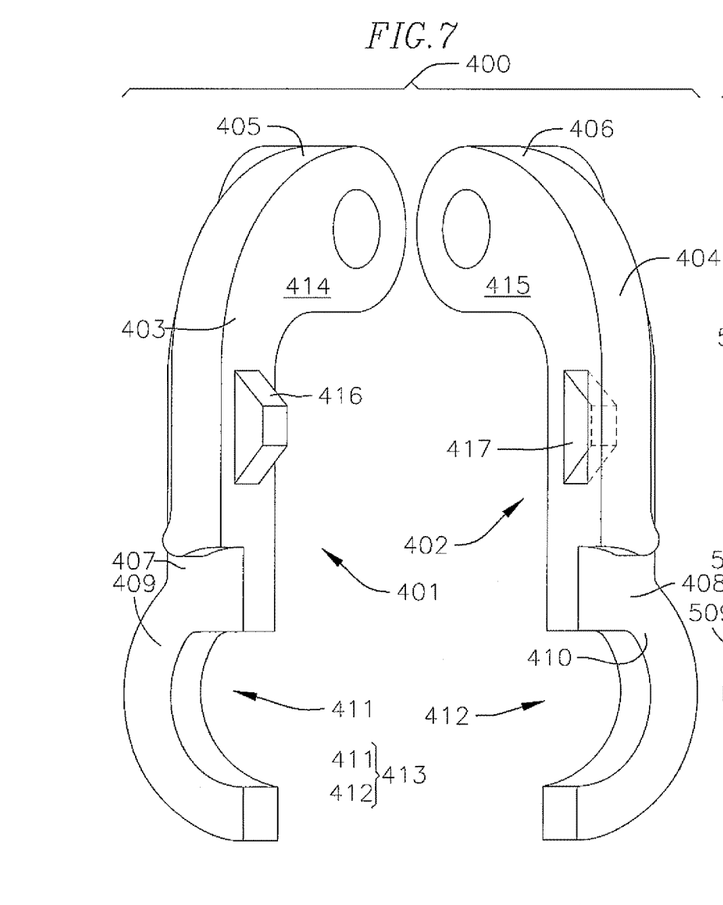
FIG. 7 is an exploded perspective view of a hinge according to another embodiment of the present disclosure.

With reference now to FIG. 7, a hinge 400 according to one embodiment of the present disclosure includes a first hinge member 401 (e.g., a left hinge member) and a second hinge member 402 (e.g., a right hinge member) configured to be detachably coupled to the first hinge member 401.

Each hinge member 401, 402 includes an arm 403, 404 having a proximal end 405, 406 and a distal end 407, 408 and a connection member 409, 410 extending from the distal end 407, 408 of the arm 403, 404. Additionally, each connection member 409, 410 defines a notch 411, 412. Together, the notches 411, 412 in the left and right hinge members 401, 402 define an opening 413 having a non-circular cross-sectional shape. The configuration of the arms 403, 404, the connection members 409, 410, and the notches 411, 412 defined by the connection members 409, 410 may be the same or similar to any of the configurations of the arms 124, 125, the connection members 130, 131, and the notches 135, 136 described above with reference to embodiment of the hinge 111 illustrated in FIGS. 1A-3B.

Additionally, in the illustrated embodiment, each of the arms 403, 404 defines an interface surface 414, 415, respectively. The interface surface 414 of the left hinge member 401 is configured to abut (e.g., contact or engage) the interface surface 415 of the right hinge member 402 when the hinge members 401, 402 are coupled together to form the hinge 400. In the illustrated embodiment, the left hinge member 401 includes a male interlocking feature 416 (e.g., a projection) extending from the interface surface 414 of the left hinge member 401 and the right hinge member 402 defines a corresponding female interlocking feature 417 (e.g., a recess) in the interface surface 415 of the right hinge member 402 that is configured to receive at least a portion of the male interlocking feature 416 of the left hinge member 301 (e.g., the male interlocking feature 416 of the left hinge member 401 is configured to mate with the female interlocking feature 417 defined in the right hinge member 402). In the illustrated embodiment, the male interlocking feature 416 of the left hinge member 401 has a trapezoidal prismatic shape and the female interlocking feature 417 defined in the interface surface 415 of the right hinge member 402 has a corresponding trapezoidal prismatic shape. The male interlocking feature 416 of the left hinge member 401 may be configured to be received in the female interlocking feature 417 in the right hinge member 402 with a press fit (i.e., a friction fit), a clearance fit, or a location fit connection. Although in the illustrated embodiment the left hinge member 401 includes the male interlocking feature 416 and the right hinge member 402 includes the corresponding female interlocking feature 417, in one or more embodiments, the left hinge member 401 may include the female interlocking feature 417 and the right hinge member 402 may include the male interlocking feature 416. In one or more embodiments, the male interlocking feature 416 may be integral with the left hinge member 401. In one or more embodiments, the male interlocking feature 416 may be separately formed from the left hinge member 401 and may be coupled to the left hinge member 401 by any suitable process. For instance, in one or more embodiments, the interface surface 414 of the left hinge member 401 may define a receptacle (e.g., a slot) configured to receive a portion of the male interlocking feature 416. In the same or substantially the same manner as described above, the engagement between the male interlocking feature 416 and the corresponding female interlocking feature 417 when the left and right hinge members 401, 402 are brought together is configured to prevent the left hinge member 401 from rotationally separating from the right hinge member 402.

Figure 8:
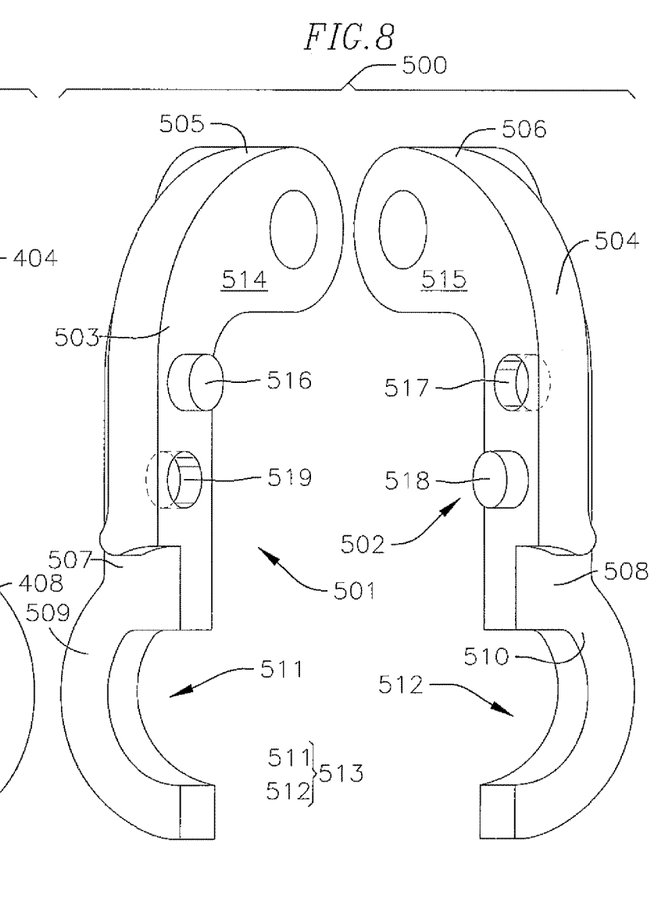
FIG. 8 is an exploded perspective view of a hinge according to another embodiment of the present disclosure.

With reference now to FIG. 8, a hinge 500 according to one embodiment of the present disclosure includes a first hinge member 501 (e.g., a left hinge member) and a second hinge member 502 (e.g., a right hinge member) configured to be detachably coupled to the first hinge member 501. Each hinge member 501, 502 includes an arm 503, 504 having a proximal end 505, 506 and a distal end 507, 508 and a connection member 509, 510 extending from the distal end 507, 508 of the arm 503, 504. Additionally, each connection member 509, 510 defines a notch 511, 512. Together, the notches 511, 512 in the left and right hinge members 501, 502 define an opening 513 having a non-circular cross-sectional shape. The configuration of the arms 503, 504, the connection members 509, 510, and the notches 511, 512 defined by the connection members 509, 510 may be the same or similar to any of the configurations of the arms 124, 125, the connection members 130, 131, and the notches 135, 136 described above with reference to embodiment of the hinge 111 illustrated in FIGS. 1A-3B.

Additionally, in the illustrated embodiment, each of the arms 503, 504 defines an interface surface 514, 515, respectively. The interface surface 514 of the left hinge member 501 is configured to abut (e.g., contact or engage) the interface surface 515 of the right hinge member 502 when the hinge members 501, 502 are coupled together to form the hinge 500. In the illustrated embodiment, the left hinge member 501 includes a first male interlocking member 516 (e.g., a first projection) extending from the interface surface 514 of the left hinge member 501 and the right hinge member 502 defines a corresponding first female interlocking feature 517 (e.g., a first recess) in the interface surface 515 of the right hinge member 502. Additionally, in the illustrated embodiment, the right hinge member 502 includes a second male interlocking feature 518 (e.g., a second projection) and the left hinge member 501 defines a corresponding second female interlocking feature 519 (e.g., a second recess). The first female interlocking feature 517 in the right hinge member 502 is configured to receive at least a portion of the first male interlocking feature 516 of the left hinge member 501 and the second female interlocking feature 519 in the left hinge member 501 is configured to receive at least a portion of the second male interlocking feature 518 of the right hinge member 502 when the left and right hinge members 501, 502 are coupled together (e.g., the first male interlocking feature 516 of the left hinge member 501 is configured to mate with the first female interlocking feature 517 defined in the right hinge member 502 and the second male interlocking feature 518 of the right hinge member 502 is configured to mate with the second female interlocking feature 519 defined in the left hinge member 501). In the illustrated embodiment, the first and second male interlocking features 516, 518 have a cylindrical shape and the first and second female interlocking features 517, 519 have corresponding cylindrical shapes. In one or more embodiments, the first and second male interlocking features 516, 518 and the first and second female interlocking features 517, 519 may have any other suitable shapes, such as, for instance, prismatic shapes (e.g., a rectangular prismatic shape (see FIG. 5) or a trapezoidal prismatic shape (see FIG. 7)) or any other suitable non-prismatic shapes (e.g., a semi-cylindrical shape (see FIG. 6)). The first and second male interlocking features 516, 518 may be configured to be received in the first and second female interlocking features 517, 519, respectively, with a press fit (i.e., a friction fit), a clearance fit, a location fit, or any other suitable type of connection.

Although in the illustrated embodiment, the first and second male interlocking features 516, 518 have the same configuration (e.g., the same size and shape) and the first and second female interlocking features 517, 519 have the same configuration (e.g., the same size and shape), in one or more embodiments, the first and second male interlocking features 516, 518 may have different configurations (e.g., different sizes and/or different shapes) and the first and second female interlocking features 517, 519 may have corresponding different configurations (e.g., different sizes and/or different shapes). Additionally, although in the illustrated embodiment the hinge 500 includes two sets or pairs of male and female interlocking features 516-519, in one or more embodiments, the hinge 500 may include any other number of male members and female interlocking features, such as, for instance, three or more pairs of male interlocking features and corresponding female interlocking features. Additionally, although in illustrated embodiment the first and second male interlocking features 516, 518 and the first and second female interlocking features 517, 519 are on opposite hinge members 501, 502, in one or more embodiments, the first and second male interlocking features 516, 518 may be on the same hinge member and the first and second female interlocking features 516, 518 may be on the same hinge member (e.g., the first and second male interlocking features 516, 518 may be on the left hinge member 501 and the first and second female interlocking features 517, 519 may be defined in the right hinge member 502 or the first and second male interlocking features 516, 518 may be on the right hinge member 502 and the first and second female interlocking features 517, 519 may be defined in the left hinge member 501).

In one or more embodiments, the first male interlocking feature 516 may be integral with the left hinge member 501 and/or the second male interlocking feature 518 may be integral with the right hinge member 502. In one or more embodiments, the first male interlocking feature 516 may be separately formed from the left hinge member 501 and may be coupled to the left hinge member 501 by any suitable process. In one or more embodiments, the second male interlocking feature 518 may be separately formed from the right hinge member 502 and may be coupled to the right hinge member 502 by any suitable process. For instance, in one or more embodiments, the interface surface 514 of the left hinge member 501 may define a receptacle (e.g., a bore) configured to receive a portion of the first male interlocking feature 516 and/or the interface surface 515 of the right hinge member 502 may define a receptacle (e.g., a bore) configured to receive a portion of the second male interlocking feature 518.

In the same or substantially the same manner as described above, the engagement between the first and second male interlocking features 516, 518 and the corresponding first and second female interlocking features 517, 519 when the left and right hinge members 501, 502 are brought together is configured to prevent the left hinge member 501 from rotationally separating from the right hinge member 502.

Figure 9:
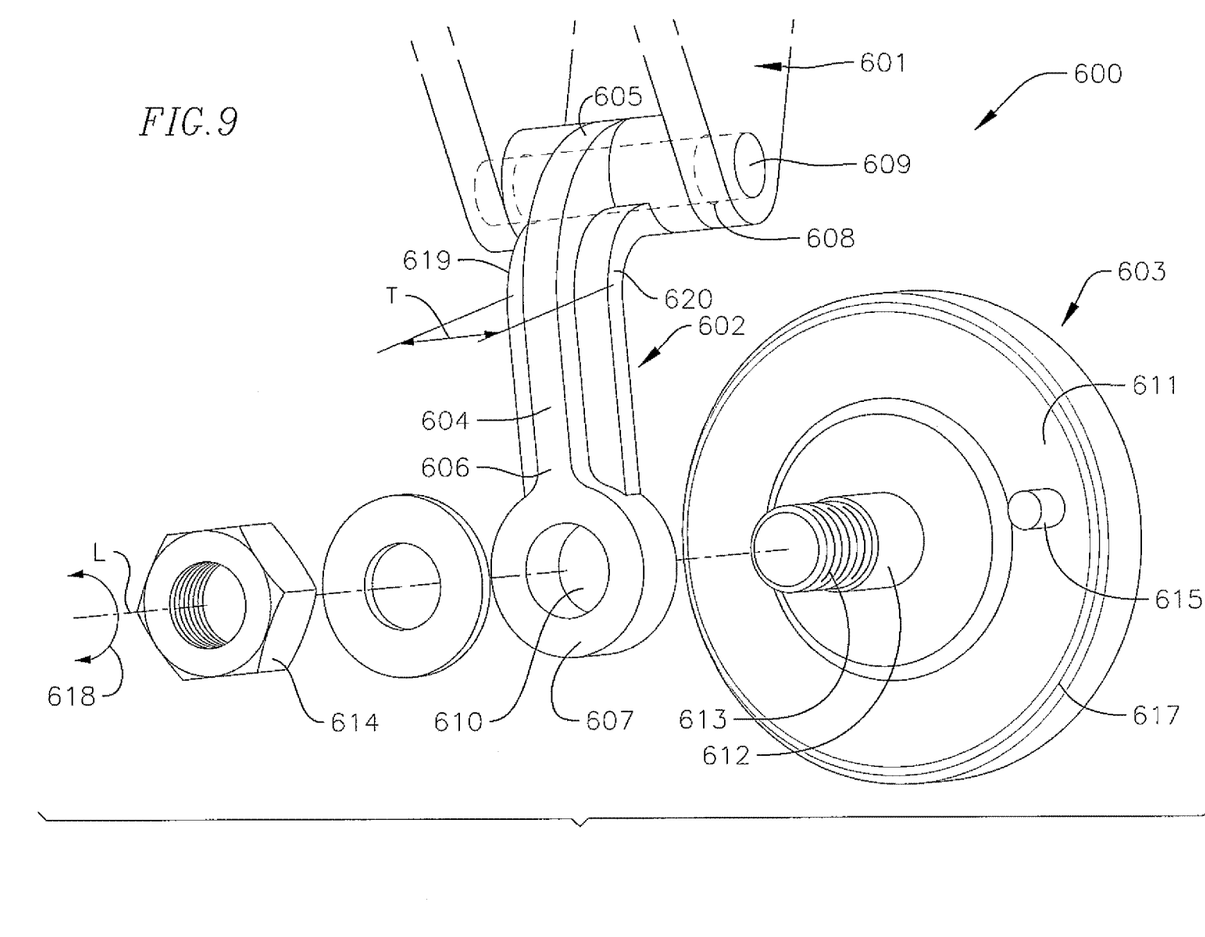
FIG. 9 is a perspective view of a hinge and disc according to another embodiment of the present disclosure.

With reference now to FIG. 9, a valve assembly 600 according to another embodiment of the present disclosure includes a clevis 601, a hinge 602 rotatably coupled to the clevis 601, and a disc 603 detachably coupled to the hinge 602. In the illustrated embodiment, the hinge 602 includes an arm 604 having a proximal end 605 and a distal end 606. Additionally, the hinge 602 includes a connection member 607 extending from the distal end 606 of the arm 604. The proximal end 605 of the arm 604 defines an opening 608 configured to receive a clevis pin 609 rotatably coupling the hinge 602 to the clevis 601. Additionally, in the illustrated embodiment, the connection member 607 of the hinge 601 defines an opening 610 configured to receive or accommodate a portion of the disc 603. In the illustrated embodiment, the opening 610 defined by the connection member 607 is circular.

In the illustrated embodiment, the disc 603 includes a sealing portion 611 and a stem portion 612 extending from the closure portion 611. Additionally, in the illustrated embodiment, the stem portion 612 of the disc 603 is cylindrical and at least a portion of the stem portion 612 includes external threads 613 extending along a length of the stem portion 612. Accordingly, in one or more embodiments, the disc 603 may be coupled to the hinge 602 by inserting the stem portion 612 of the disc 603 through the opening 610 in the hinge 602 and threading a nut 614 onto the external threads 613 of the stem portion 612.

Additionally, in the illustrated embodiment, the disc 603 includes a stop 615 projecting from a rear surface 616 of the sealing portion 611 (e.g., the stop 615 and the stem portion 612 project in the same direction from the sealing portion 611). In the illustrated embodiment, the stop 615 is cylindrical (e.g., pin-shaped). In one or more embodiments, the stop 615 may have any other suitable shape, such as, for instance, a prismatic shape, any other suitable non-prismatic shape, or a combination or portion thereof. The stop 615 may be located at any suitable radial position along the sealing portion 611 of the disc 603, such as, for instance, at an outer radial position along a periphery 617 of the sealing portion 611, at an inner radial position (e.g., proximate the stem portion 612), or at an intermediate radial position between the outer and inner radial positions. When the disc 603 is coupled to the hinge and the disc 603 rotates (arrow 618) (e.g., spins about a longitudinal axis L of the stem portion 612 and the sealing portion 611 of the disc 603), the stop 615 is configured to contact a side 619, 620 of the hinge 602. The side 619, 620 of the hinge 602 that the stop 615 contacts depends on the direction in which the disc 603 rotates (arrow 618). For instance, in the illustrated embodiment, if the disc 603 rotates (arrow 618) in the clockwise direction, the stop 615 is configured to contact one side 619 of the hinge 602 and if the disc 603 rotates (arrow 618) in the counterclockwise direction, the stop 615 is configured to contact the other side 620 of the hinge 602. The contact (e.g., engagement) between the stop 615 and the hinge 602 is configured to prevent further rotation (arrow 618) of the disc 603 (i.e., the stop 615 is configured to contact the hinge 602 to limit rotation of the disc 603 relative to the hinge 602 and thereby prevent a full 360-degree rotation of the disc 603). Although in the illustrated embodiment the disc 603 includes a single stop 615, in one or more embodiments, the disc 603 may include two stops to further limit rotation of the disc 603 relative to the hinge 602. For instance, in one or more embodiments, the disc 603 may include a pair of stops positioned on the sealing portion 611 of the disc 603 such that when the disc 603 is coupled to the hinge 602, the stops are located on opposite sides of the hinge 602 (e.g., one stop may be proximate one side 619 of the hinge 602 and the other stop may be proximate the other side 620 of the hinge 602). In one or more embodiments, the spacing between the two stops may be equal or substantially equal to a thickness T of the hinge 602 (e.g., the distance between the sides 619, 620 of the hinge 602) to prevent all or substantially all rotation (arrow 618) of the disc 603 relative to the hinge 602. Accordingly, whereas the embodiment of the valve assembly 102 described above with reference to FIGS. 1A-4 includes a hinge 111 defining an opening 141 having a non-circular cross-sectional shape configured to receive a stem portion 156 of a disc 603 having a non-circular cross-sectional shape to limit or prevent rotation of the disc 112 relative to the hinge 111, the embodiment of the valve assembly 600 illustrated in FIG. 9 includes one or more stops 615 on the disc 603 configured to contact (e.g., engage) the hinge 602 to limit or prevent rotation (arrow 618) of the disc 603 relative to the hinge 602. The one or more stops 615 may be integral with the sealing portion 611 of the disc 603 or the one or more stops 615 may be coupled to the sealing portion 611 of the disc 603 (e.g., the one or more stops 615 may be mechanically coupled to the sealing portion 611 of the disc 603).

Although in the illustrated embodiment the hinge 602 is a single monolithic component, in one or more embodiments, the hinge 602 may be an assembly of two or more components configured to be detachably coupled together. For instance, in one or more embodiments, the hinge 602 may include a first hinge member (e.g., a left hinge member) and a second hinge member (e.g., a right hinge member) configured to be detachably coupled together that may be the same or similar to the embodiment of the first hinge member 122 and the second hinge member 123 described above with reference to FIGS. 1A-3B. Additionally, in one or more embodiments in which the hinge 602 includes a first hinge member and a second hinge member configured to be detachably coupled together, the disc 603 may be the same as or similar to the embodiment of the disc 112 described above with reference to FIGS. 1A-4, with the exception of the presence of the one or more stops 615. For instance, in one or more embodiments, the disc 603 may include a retention portion integral with the stem portion 612, rather than the nut 614 illustrated in FIG. 9, that is configured to maintain the disc 603 connected to the hinge 602.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. One or more of the features described with reference to one embodiment may be combined with one or more other features described with reference to one or more other embodiments to provide a workable device. Although relative terms such as "left," right," "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "generally," and similar terms are used as terms of approximation and not as terms of degree, and are intended to account for the inherent deviations in measured or calculated values that would be recognized by those of ordinary skill in the art. Furthermore, as used herein, when a component is referred to as being "on" or "coupled to" another component, it can be directly on or attached to the other component or intervening components may be present therebetween. Further, any described feature is optional and may be used in combination with one or more other features to achieve one or more benefits.

What is claimed is:

1. A check valve, comprising:
   a clevis;
   a hinge pin;
   a hinge configured to be rotatably coupled to the clevis by the hinge pin, the hinge comprising:
   a first hinge member comprising a male interlocking feature; and
   a second hinge member defining a female interlocking feature corresponding to the male interlocking feature, the second hinge member configured to be detachably coupled to the first hinge member, wherein the first hinge member and the second hinge member when coupled together define a single opening having a non-circular cross-sectional shape that includes a straight inner wall section and a curved inner wall section; and
   a disc configured to be detachably coupled to the hinge, wherein the disc comprises a stem portion having a non-circular cross-sectional shape that corresponds to the opening defined by the first and second hinge members such that the disc is prevented from rotating relative to the hinge when secured within the opening, and
   wherein, when the first hinge member is coupled to the second hinge member, the male interlocking feature of the first hinge member is received in the female interlocking feature defined in the second hinge member to prevent angular separation of the first and second hinge members about the hinge pin.

2. The check valve of claim 1, wherein the male interlocking feature of the first hinge member comprises a shape selected from the group of shapes consisting of a cylinder, a cylindrical segment, a rectangular prism, a trapezoidal prism, and portions thereof.

3. The check valve of claim 1, wherein the male interlocking feature is configured to be received in the female interlocking feature with a press fit connection.

4. The check valve of claim 1, wherein the male interlocking feature is integral with a remainder of the first hinge member, and wherein the first hinge member is monolithic.

5. The check valve of claim 1, wherein the male interlocking feature is a locating pin separable from a remainder of the first hinge member, and wherein a first portion of the locating pin is configured to be received in a receptacle defined in the first hinge member and a second portion of the locating pin is configured to be received in the female interlocking feature defined in the second hinge member.

6. The check valve of claim 1, further comprising a second female interlocking feature defined in one of the first hinge member or the second hinge member, wherein the other of the first hinge member or the second hinge member further comprises a second male interlocking feature, and wherein the second male interlocking feature is configured to be received in the second female interlocking feature when the first hinge member is coupled to the second hinge member.

7. The check valve of claim 1, wherein the disc further comprises:
   a sealing portion; and
   a retention portion spaced apart from the sealing portion, wherein the stem portion extends between the sealing portion and the retention portion.

8. The check valve of claim 7, wherein:
   the retention portion is integral with the stem portion of the disc,
   the sealing portion and the retention portion each have a size larger than a size of the opening defined by the first and second hinge members, and
   when the disc is coupled to the hinge, the sealing portion and the retention portion of the disc are on opposite sides of the hinge.

9. A check valve, comprising:
a clevis;
a hinge pin;
a hinge configured to be rotatably coupled to the clevis by the hinge pin, the hinge comprising a first hinge member and a second hinge member that when coupled together define a single opening having a non-circular cross-sectional shape;
a disc configured to be detachably coupled to the hinge, the disc comprising a sealing portion and a stem portion extending from the sealing portion, the stem portion comprising a non-circular cross-sectional shape,
wherein, when the disc is coupled to the hinge, the stem portion is received in the opening defined in the hinge, and engagement between the stem portion of the opening defined in the hinge is configured to prevent rotation of the disc about an axis of the disc relative to the hinge.

10. The check valve of claim 9, wherein the non-circular cross-sectional shape of the stem portion comprises at least one flat surface and the non-circular cross-sectional shape of the opening in the hinge comprises at least one flat surface, and wherein when the disc is coupled to the hinge, the at least one flat surface of the stem portion is aligned with the at least one flat surface of the opening to prevent rotation of the disc relative to the hinge.

11. The check valve of claim 9, wherein the opening defined in the hinge and the stem portion of the disc each comprise a truncated circular cross-sectional shape.

12. The check valve of claim 9, wherein the non-circular cross-sectional shape of the opening is different than the non-circular cross-sectional shape of the stem portion of the disc.

13. The check valve of claim 9, wherein the opening in the hinge has a shape selected from the group of non-circular shapes consisting of a prismatic shape, a non-prismatic shape, and an irregular shape.

14. The check valve of claim 9, wherein the second hinge member configured to be detachably coupled to the first hinge member.

15. The check valve of claim 14, wherein the first hinge member comprises a male interlocking feature and wherein the second hinge member defines a female interlocking feature configured to receive the male interlocking feature.

* * * * *